United States Patent
Maekawa et al.

(10) Patent No.: US 8,038,849 B2
(45) Date of Patent: Oct. 18, 2011

(54) PROCESS FOR PRODUCING A CARBON-PARTICLE STRUCTURE

(75) Inventors: Toru Maekawa, Kawagoe (JP);
Yoshikazu Yoshida, Kawagoe (JP);
Takahiro Fukuda, Kawagoe (JP)

(73) Assignee: Toyo University Educational Foundation, Bunkyo-Ku (JP)

( * ) Notice: Subject to any disclaimer, the term of this patent is extended or adjusted under 35 U.S.C. 154(b) by 51 days.

(21) Appl. No.: 12/464,318

(22) Filed: May 12, 2009

(65) Prior Publication Data

US 2009/0223807 A1 Sep. 10, 2009

Related U.S. Application Data

(62) Division of application No. 11/597,231, filed as application No. PCT/JP2005/010001 on May 25, 2005, now Pat. No. 7,807,025.

(30) Foreign Application Priority Data

May 25, 2004 (JP) ................................ 2004-155081

(51) Int. Cl.
*B01J 19/12* (2006.01)
*C01B 31/00* (2006.01)

(52) U.S. Cl. ......... 204/157.41; 204/157.47; 204/157.15; 204/157.5

(58) Field of Classification Search ............. 204/157.15, 204/157.41, 157.47, 157.5
See application file for complete search history.

(56) References Cited

U.S. PATENT DOCUMENTS

| 1,811,889 A | * | 6/1931 | Lewis .................... 204/157.47 |
| 3,113,086 A | | 12/1963 | Thomas |
| 5,323,413 A | * | 6/1994 | Gergely et al. ............ 204/157.4 |
| 5,876,684 A | * | 3/1999 | Withers et al. ........... 204/157.41 |
| 5,996,155 A | | 12/1999 | Chao et al. |
| 2002/0005345 A1 | | 1/2002 | Avnery |
| 2004/0025891 A1 | | 2/2004 | McAdam et al. |

FOREIGN PATENT DOCUMENTS

| DE | 201 20 718 U1 | 3/2003 |
| JP | 04-135621 A1 | 5/1992 |
| JP | 2001-264248 A1 | 9/2001 |
| JP | 2003-535681 A1 | 12/2003 |

OTHER PUBLICATIONS

Zappoli et al, "Anomalous heat transport by the piston effect in supercritical fluids under zero gravity," Phys. Rev. A 41(4), Feb. 15, 1990 pp. 2264-2267.*

Garrabos et al, "Relaxation of a supercritical fluid after a heat pulse in the absence of gravity effects: theory and experiments," Phys. Rev. E 57(5), May 1998, pp. 5665-5680.*

(Continued)

*Primary Examiner* — Keith Hendricks
*Assistant Examiner* — Colleen M Raphael
(74) *Attorney, Agent, or Firm* — Burr & Brown

(57) ABSTRACT

A process for producing a carbon-particle structure, including the step of irradiating opaque carbon dioxide at and/or near its critical point, as light is scattered, with a UV-wavelength laser beam to produce a carbon-particle structure.

6 Claims, 10 Drawing Sheets

OTHER PUBLICATIONS

Somayajulu, "Estimation Procedures for Critical Constants," J. Chem. Eng'g Data 1989 (34), pp. 106-120.*

Oehlschlaeger et al, "Ultraviolet absorption cross-sections of hot carbon dioxide," Chem. Phys. Lett. 399 (2004), pp. 490-495.*

Schulz et al, "Ultraviolet absorption spectra of shock-heated carbon dioxide and water between 900 and 3050 K," Chem. Phys. Lett. 355 (2002) pp. 82-88.*

Jensen et al, "The ultraviolet absorption spectrum of hot carbon dioxide," Chem. Phys. Lett. 277 (1997), pp. 356-360.*

Zuev et al, "UV Absorption Cross Section of the Molecules O2, NO, N2O, CO2, H2O, and NO2," J. Appl. Spectroscopy 1990 pp. 304-313.*

Lotkova et al, "Dissociation of Carbon Dioxide and Inversion in CO2 Laser," J. Quantum. Electron. vol. QE-7, No. 8, Aug. 1971.*

Taku Arai et al., "*Creation of Carbide in Critical $Co_2$ by UV Laser*," Proceedings of SPIE International Society for Optical Engineering, Fifth International Symposium on Laser Precision Microfabrication, Oct. 8, 2004, vol. 5662, pp. 454-457.

Kaneco et al., "*Photocatalytic Reduction of $Co_2$, Using $TiO_2$ Powders in Liquid $Co_2$, Medium*," Journal of Photochemistry and Photobiology A: Chemistry, vol. 109, 1997, pp. 59-63.

Koda et al., "*Photooxidation Reactions in Supercritical $Co_2$*", Process Tech. Proceedings, 1996, 12 (High Pressure Chemical Engineering), pp. 97-101. (Abstract Only).

Herchefinkel, "*The Decomposition of Carbon Dioxide by Ultraviolet Rays*," Compt. Rend., 1909, vol. 149, p. 395. (Abstract Only).

Kolpakov et al., "*Measurement of the Degree of Polarization of Scattered Light in the Vicinity of the Carbon Dioxide Critical Point Using a Helium-Neon Laser*," Optika 1 Spektroskopiya, 1970, vol. 29, No. 4, pp. 761-764. (Abstract Only).

Bouchiat et al., "*Thermal Fluctuations at the Liquid-Vapor Interface of Carbon Dioxide Near the Critical Point*," J. de Physique, Colloque (1971), vol. 5, pp. 181-184.

http://www.jlps.gr.jp/lpm/lpm2004/. "LPM2004 Program," Japan Laser Processing Society. May 11, 2004.

\* cited by examiner

PROCESS FOR PRODUCING A CARBON-PARTICLE STRUCTURE

CROSS REFERENCE TO RELATED APPLICATIONS

This application is a division of U.S. patent application Ser. No. 11/597,231 filed Nov. 21, 2006, now issued as U.S. Pat. No. 7,807,025 which was the National Stage of International Application No. PCT/JP2005/010001 filed May 25, 2005, the entireties of which are incorporated herein by reference.

FIELD OF THE INVENTION

This invention relates to a novel method of decomposing carbon dioxide, which is useful for solving carbon dioxide environmental problems, and a novel method of forming a carbon particle structure by the decomposition.

BACKGROUND OF THE INVENTION

Carbon dioxide reduction is a worldwide important task to be accomplished from the viewpoint of global environmental problems. However, effective methods have not been developed for the decomposition treatment of carbon dioxide discharged, for example, from living environment and industrial environment.

Carbon dioxide: $CO_2$ is a compound of carbon and oxygen. Accordingly, if $CO_2$ can be decomposed and utilized as a novel carbon resource, then a great contribution to the society could be realized.

The current situation, however, is that studies on carbon dioxide decomposition and effective utilization of carbon dioxide as a carbon resource have not hitherto been made very eagerly.

SUMMARY OF THE INVENTION

In view of the above, an object of the present invention is to provide a novel technical method that can realize carbon dioxide reduction, which is a task to be urgently accomplished from the viewpoint of global environmental problems, that can realize carbon dioxide decomposition for the carbon dioxide reduction, and that can realize the utilization of carbon resources obtained from the carbon dioxide with a higher added value.

The object of the present invention can be attained by a method for decomposing carbon dioxide, comprising the step of irradiating carbon dioxide in a supercritical or subcritical state (i.e., at and/or near its critical point) with a UV-wavelength laser beam to decompose carbon dioxide.

Secondly, the object of the present invention can be attained by a process for producing a carbon-particle structure, comprising the step of irradiating carbon dioxide in a supercritical or subcritical state with a UV-wavelength laser beam to produce a carbon-particle structure.

DETAILED DESCRIPTION OF THE INVENTION

Figure 1:
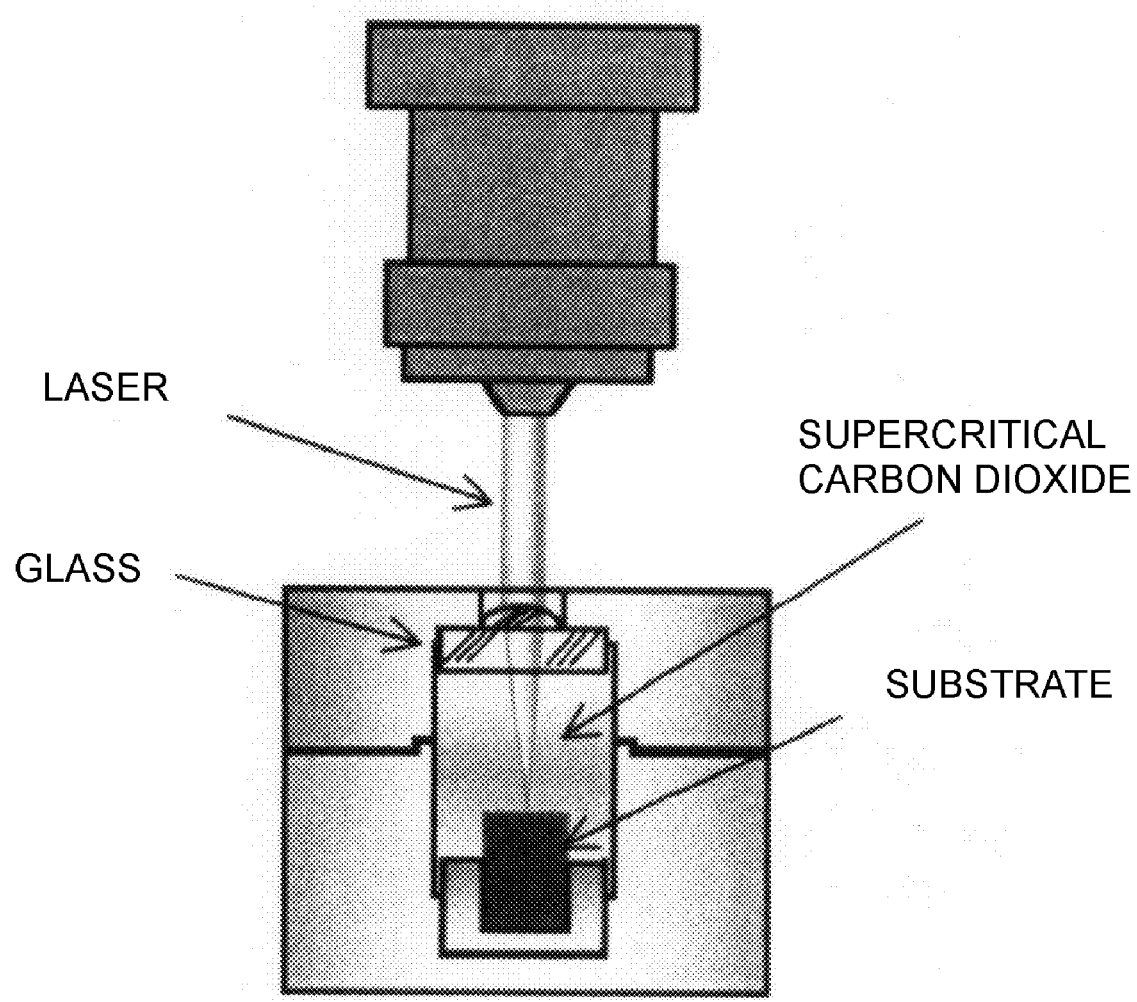
FIG. 1 is a schematic diagram showing the construction of an apparatus used in the working example.
Figure 2:
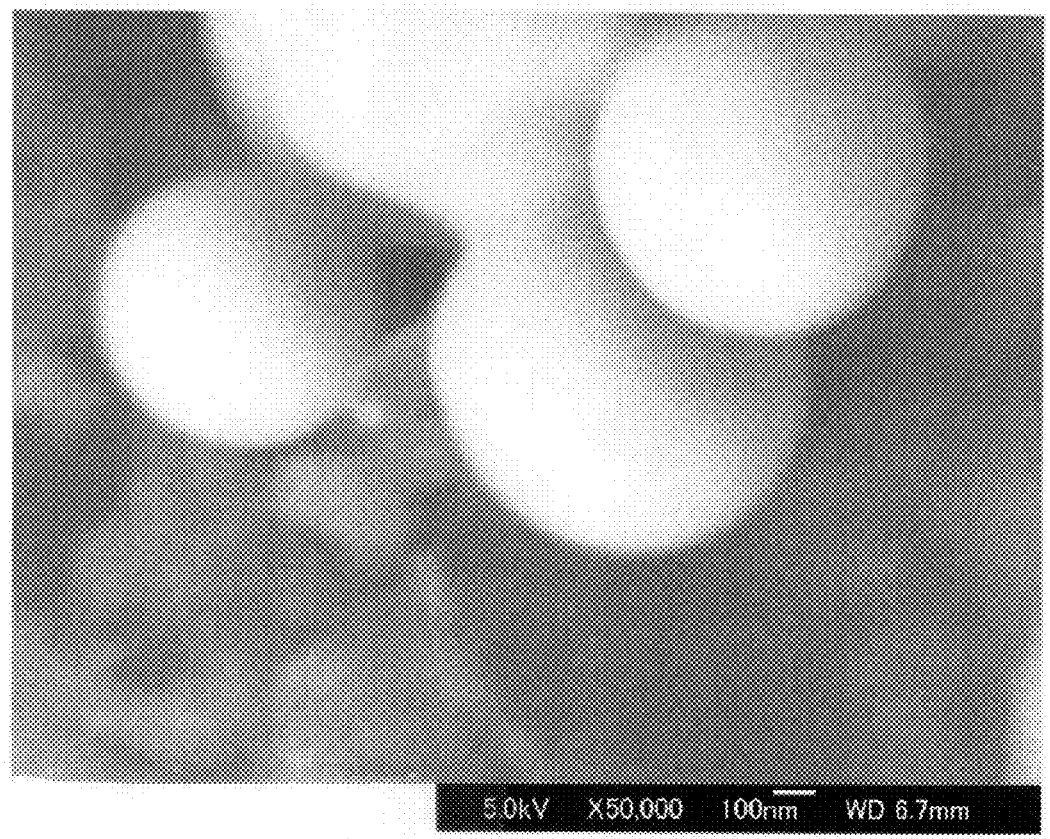
FIG. 2 is a diagram showing an image that exemplifies an SEM image of a carbon particle structure produced in Example 1.
Figure 3:
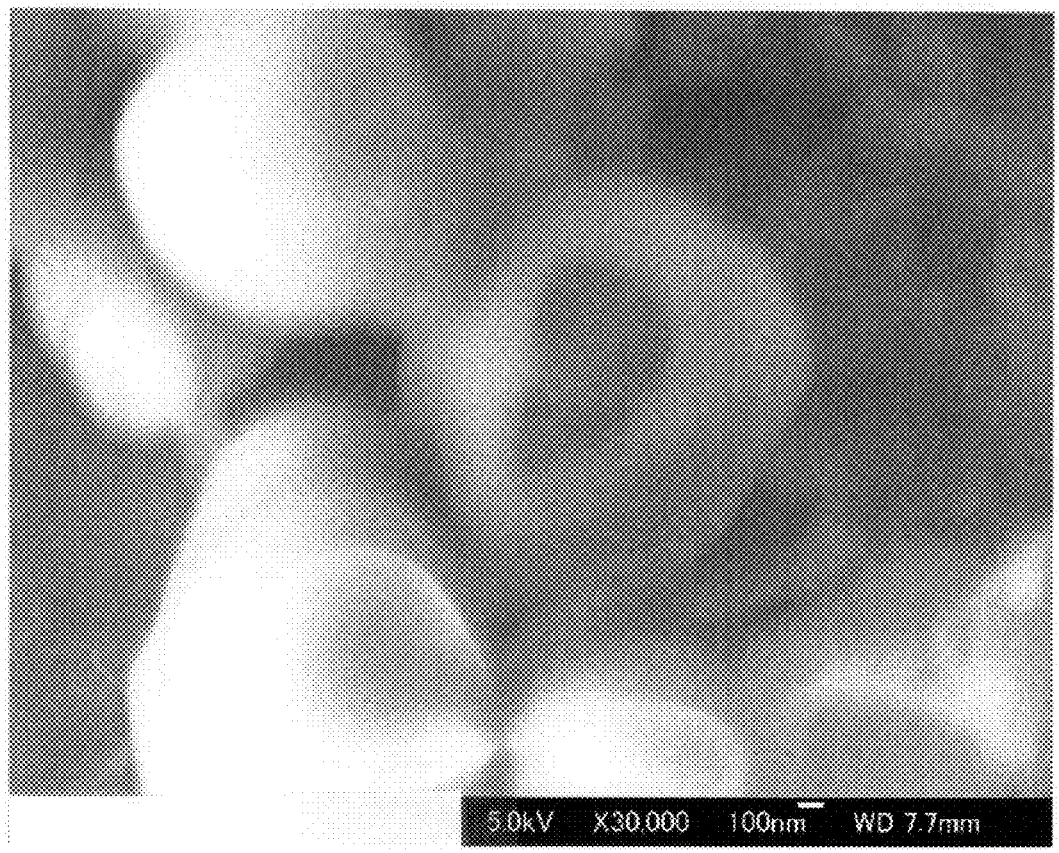
FIG. 3 is a diagram showing an image that exemplifies another SEM image of the carbon particle structure produced in Example 1.
Figure 4:
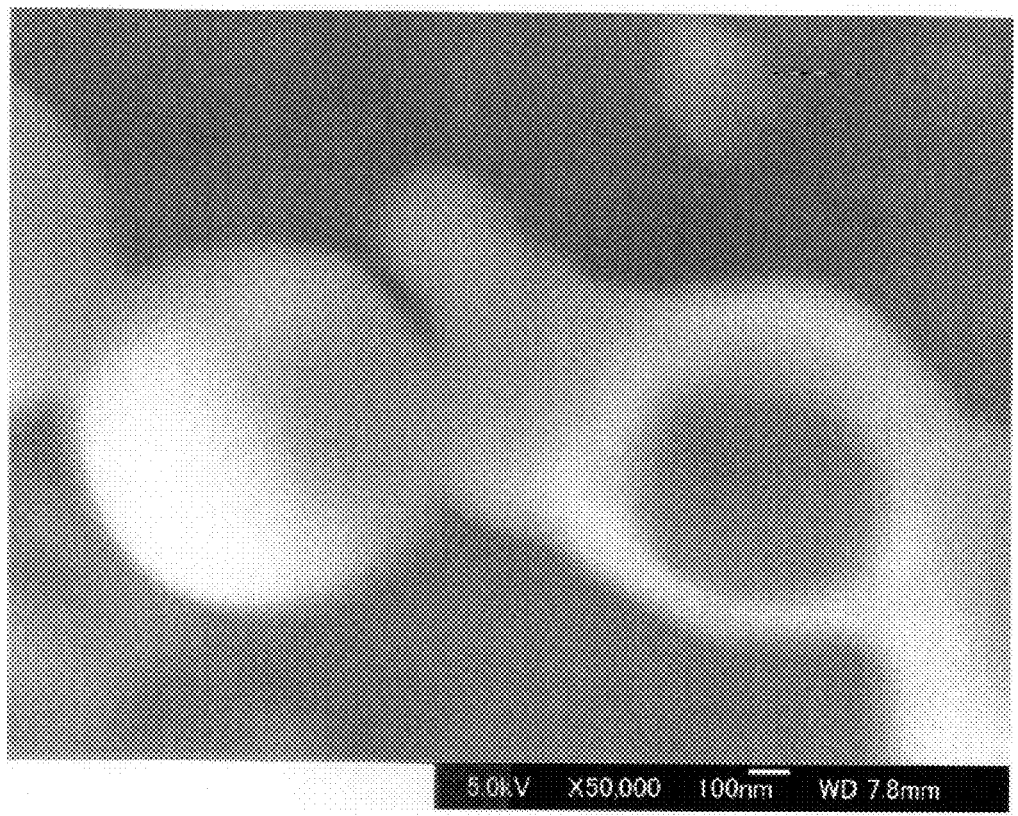
FIG. 4 is a diagram showing an image that exemplifies still another SEM image of the carbon particle structure produced in Example 1.
Figure 5:
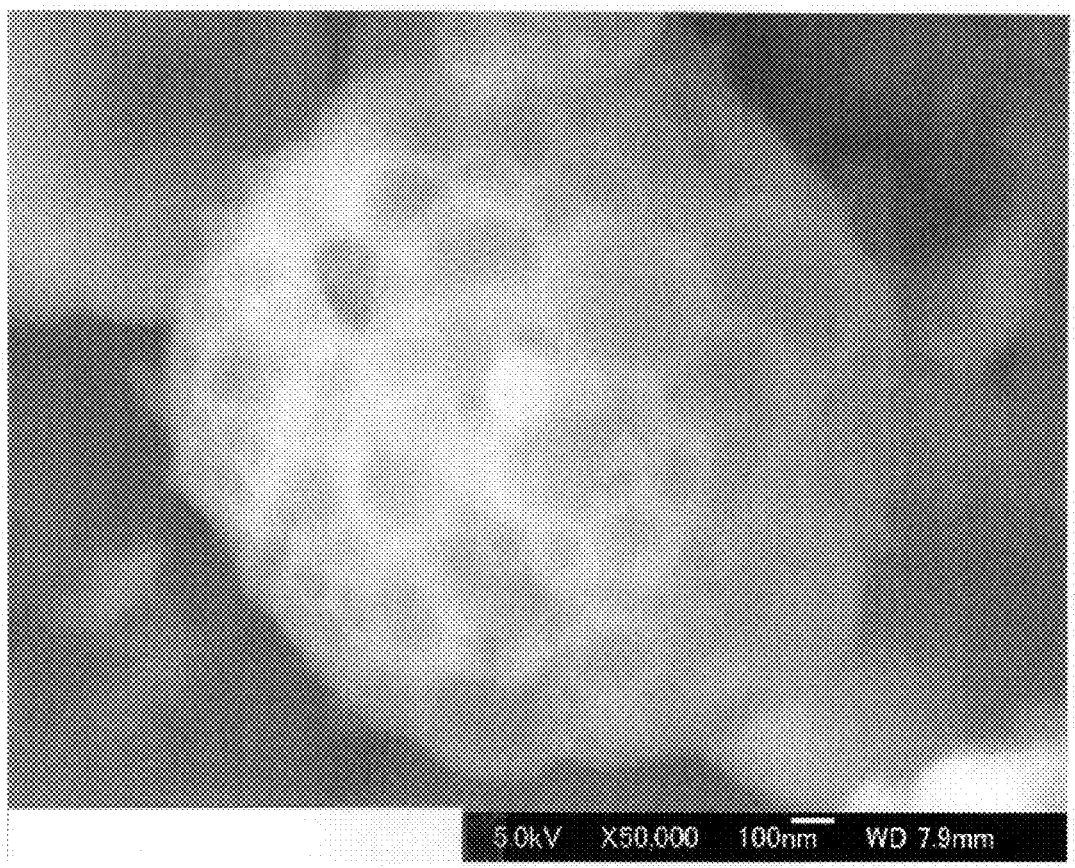
FIG. 5 is a diagram showing an image that exemplifies a further SEM image of the carbon particle structure produced in Example 1.

The best mode for carrying out the invention having the above features will be described.

In the decomposition of carbon dioxide and the production of a carbon particle structure according to the present invention, carbon dioxide that is in a supercritical or subcritical state in relation to its critical point (critical density 466 kg/m$^3$, critical pressure 7.38 MPa, critical temperature 304.2 K) is irradiated with a UV-wavelength laser beam. Various laser beam sources and optical system can be properly adopted for this irradiation. Typical examples of UV (ultraviolet)-wavelength laser beams include YAG-THG (tertiary high frequency): wavelength 355 nm, YAG-FHG (quaternary high frequency): wavelength 266 nm, and KrF excimer: wavelength: 248 nm.

In the UV-wavelength laser beam irradiation, the laser beam may not be focused, or alternatively may if necessary be focused.

Further, any proper apparatus may be used for bringing the carbon dioxide to a supercritical or subcritical state.

In the production of the carbon-particle structure, a substrate may be used, and examples of substrates usable herein include substrates formed of various metals such as aluminum, nickel, tungsten, molybdenum, magnesium, silver, gold, tin, titanium, tantalum, and silicon, various metal alloys such as stainless steel, nickel-base alloys, and magnesium alloys, or inorganic materials such as alumina, graphite, BN and SiC. Alternatively, these substrates may not be used.

As exemplified also in the working example which will be described later, the carbon particle structure is produced as a single particulate body or is produced in such a state that a plurality of particulate bodies have been aggregated, fused or bonded together. The size of these carbon particle structures is very small and is usually not more than several tens of micrometers (μm), for example, in the range of several tens of nanometers (nm) to several tens of micrometers (μm). This size can be regulated by irradiation energy, for example, the wavelength of the UV-wavelength laser or irradiation time.

Further, a carbon particle structure having a concave on its surface, a hollow carbon particle structure, or a semispherical or partially spherical carbon particle structure can also be produced.

At the present stage, the method and process according to the present invention are considered based on the following mechanism.

Near the critical point of carbon dioxide (critical density 466 kg/m$^3$, critical pressure 7.38 MPa, critical temperature 304.2 K), large molecule clusters are produced and the structure becomes opaque (critical opaline luster) as light is scattered. Due to this nature, various unique behaviors regarding physical properties are exhibited. For example, the specific heat or compressibility diverges as approaching the critical point.

Upon exposure of carbon dioxide near the critical point to UV laser, it is considered that, when photons collide against C—O bond, the C—O bond is cleaved. That is, a carbon dioxide decomposition process ($CO_2 \rightarrow C+O_2$) is considered to take place stochastically. In particular, as described above, since large molecule clusters are formed near the critical point, it is considered that the probability of collision of photons against $CO_2$ increases and, consequently, the decomposition process ($CO_2 \rightarrow C+O_2$) is promoted. Carbon atoms are bonded to each other to form a nanostructure or microstructure. It is considered that, as the temperature difference from the critical point increases, the probability of collision of photons against $CO_2$ molecules is reduced, resulting in a reduced $CO_2$ decomposition rate.

It is needless to say that the above consideration will be further deepened and developed.

The following Examples further illustrate the present invention.

However, it should be noted that the present invention is not limited to the following Examples.

Example 1

FIG. 1 is a schematic diagram showing an apparatus used in this Example. The apparatus is constructed so that a substrate is disposed inside of the apparatus and a laser beam is applied through a glass window. Carbon dioxide was introduced into this apparatus, and the carbon dioxide was irradiated near the critical point (atmosphere temperature 31.4° C.) with a 266 nm-wavelength UV laser beam. As a result, the decomposition of carbon dioxide and the production of a carbon-particle structure were observed.

Figure 6:
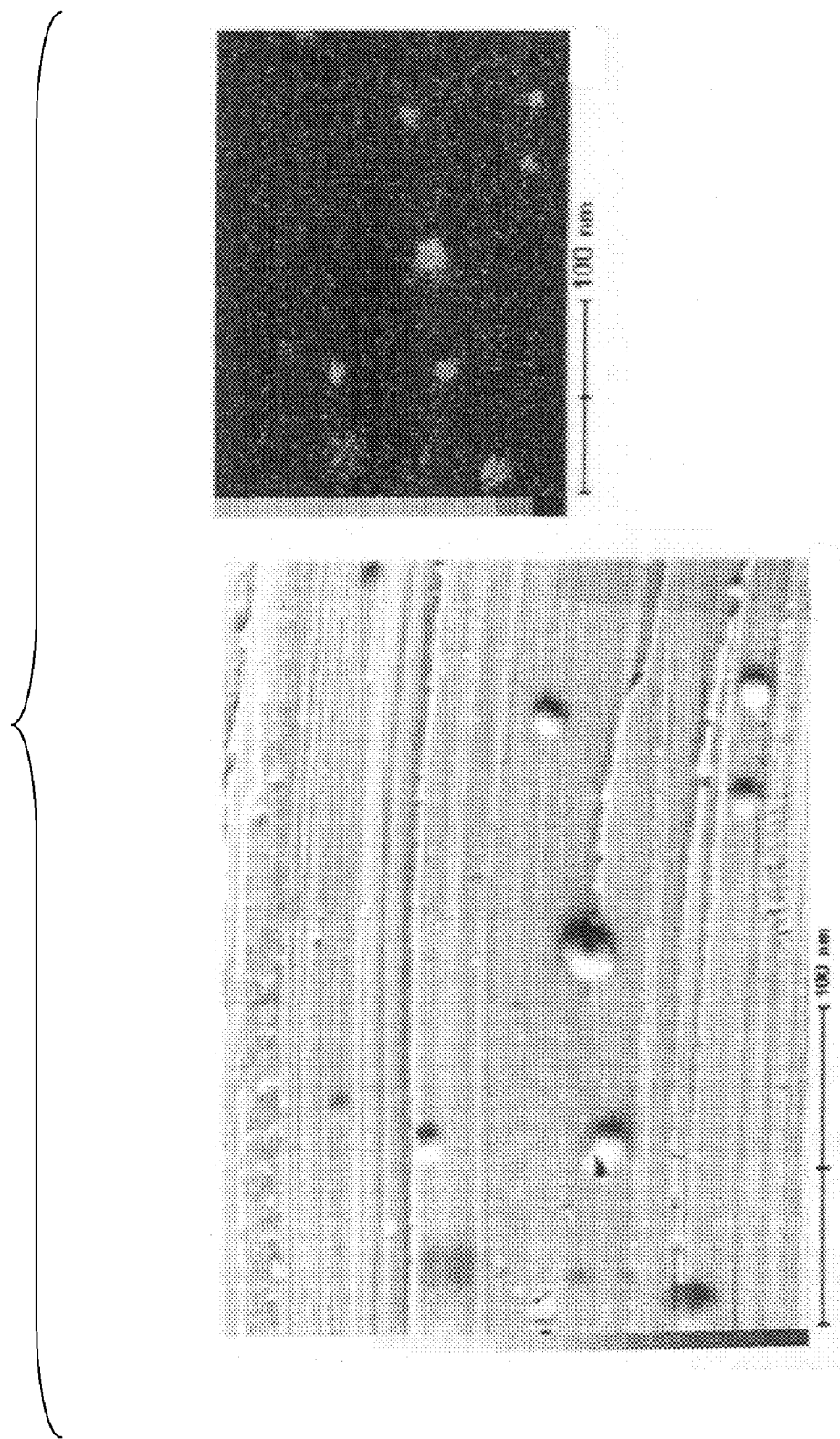
FIG. 6 is an image that exemplifies the results of an EDS analysis of the carbon-particle structure produced in Example 1.

FIGS. 2, 3, 4 and 5 exemplify SEM images of the produced carbon particle structure. FIG. 6 exemplifies the results of an EDS analysis of the carbon-particle structure produced on an aluminum substrate, indicating that the resultant structure is a carbon-particle structure.

It was found that the production of the carbon-particle structure is observed in the case where an aluminum, graphite or other substrate is used, as well as in the case where no substrate is used.

For comparison, carbon dioxide with one atom of pressure was irradiated with the above laser beam. As a result, the production of a carbon-particle structure could not be observed at all. In this case, when an aluminum substrate was used, nano-size aluminum spheres were produced.

Example 2

In the same apparatus as in Example 1, a silicon substrate is disposed within the apparatus, carbon dioxide near the critical point was irradiated with a 266 nm-wavelength UV laser beam without focusing. As a result, it was confirmed that a carbon particle nanostructure was produced on the silicon substrate.

Figure 7:
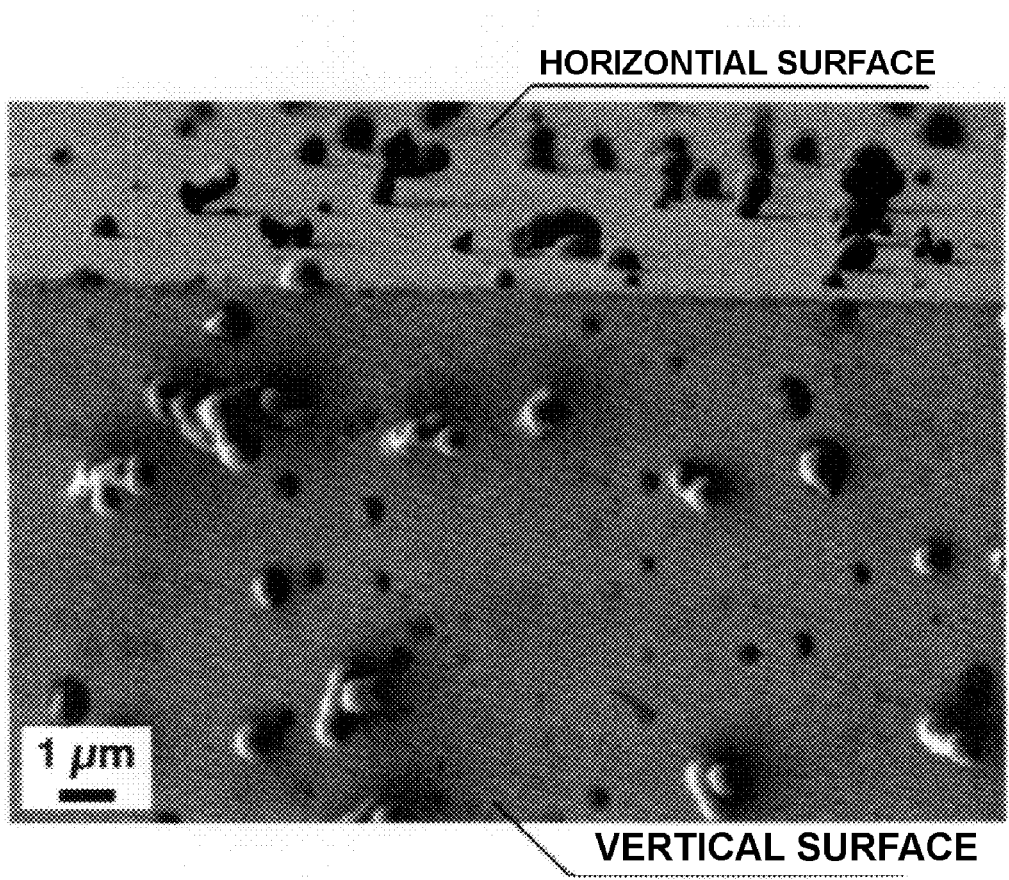
FIG. 7 is a diagram showing an image that exemplifies an SEM image of a carbon particle structure produced in Example 2.
Figure 8:
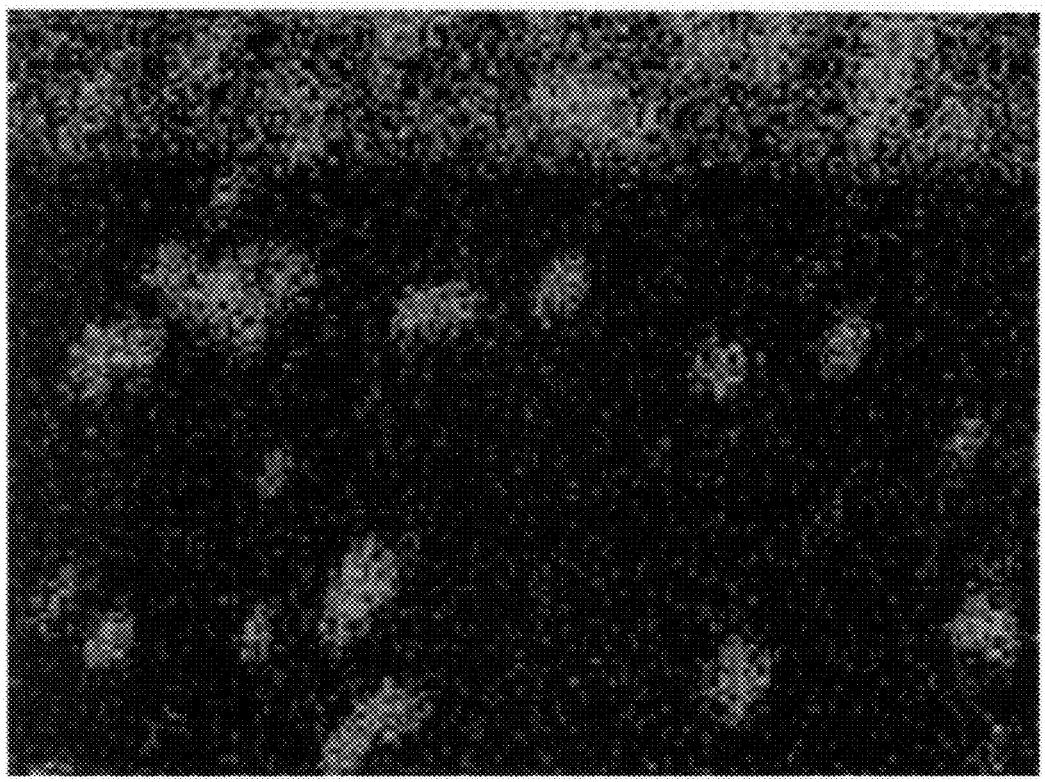
FIG. 8 is a diagram showing an EDS image of the carbon particle structure shown in FIG. 7.

FIG. 7 exemplifies an SEM image of the resultant carbon particle structure deposited on a horizontal surface and a vertical surface of the silicon substrate. FIG. 8 is an EDS image corresponding to FIG. 7 in which the green part shows carbon atoms.

Figure 9:
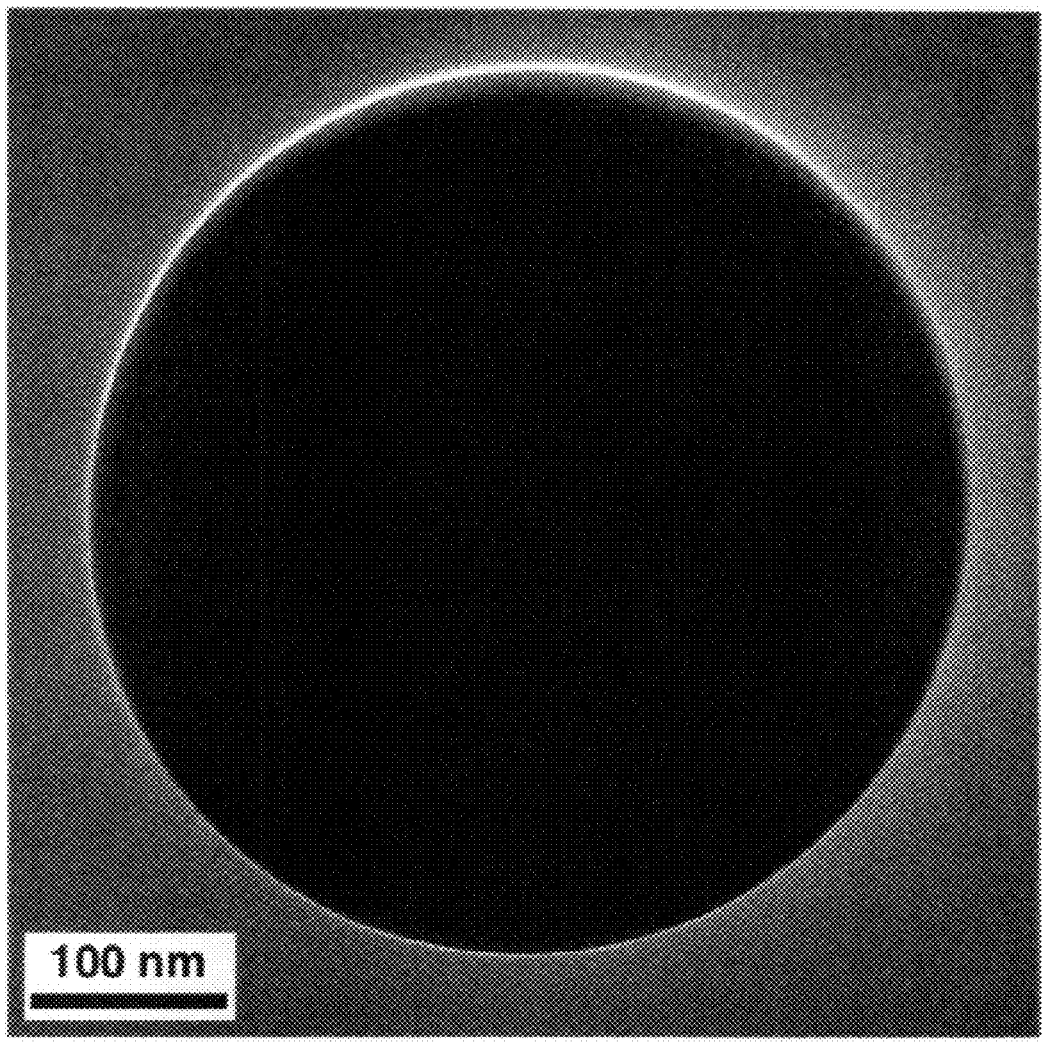
FIG. 9 is a diagram showing a TEM image of the carbon particle structure shown in FIG. 7.
Figure 10:
FIG. 10 is a diagram showing an electron beam diffraction image of the carbon particle structure shown in FIG. 7.

FIG. 9 shows a TEM image of a carbon particle structure, and FIG. 10 shows an electron beam diffraction image of the carbon particle structure, indicating that the carbon particle structure is an amorphous structure.

Example 3

The procedure of Example 2 was repeated, except that each of nickel, magnesium, and carbon substrates were used instead of the silicon substrate. In this case, the UV wavelength laser beam was used for irradiation as in Example 2. As a result, it was confirmed that, in all of these substrates, a carbon particle structure was produced.

Example 4

The procedure of Example 2 was repeated, except that a 248 nm-wavelength UV laser beam was used for irradiation instead of the 266 nm-wavelength UV laser beam. Also in this case, it was confirmed that a carbon particle structure was produced.

INDUSTRIAL APPLICABILITY

The first embodiment of the present invention can realize the decomposition of carbon dioxide at or around room temperature. UV wavelength laser irradiation does not cause a temperature rise upon decomposition. According to the second embodiment of the present invention, upon the decomposition of carbon dioxide as a carbon resource, a carbon particle structure useful as a functional material in various fields such as electric, electronic, medical, catalyst, lubricant, plastic, and mechanically molded product fields can be produced. The production of the carbon particle structure is also possible without the use of any substrate.

What is claimed:

1. A process for producing a carbon-particle structure, comprising the step of irradiating opaque carbon dioxide at and/or near its critical point, as light is scattered, with a UV-wavelength laser beam to produce a carbon-particle structure.

2. The process for producing a carbon-particle structure according to claim 1, wherein the carbon-particle structure is produced on a substrate.

3. The process for producing a carbon-particle structure according to claim 1, wherein the carbon-particle structure has an amorphous structure.

4. A process for producing a carbon-particle structure, comprising the steps of:
   irradiating opaque carbon dioxide at and/or near the critical point, as light is scattered, with photons; and
   colliding the photons with the carbon dioxide to produce the carbon-particle structure.

5. The process for producing a carbon-particle structure according to claim 2, wherein the carbon-particle structure has an amorphous structure.

6. A process for producing a carbon-particle structure, comprising the steps of:
   irradiating large molecule clusters of opaque carbon dioxide produced at and/or near the critical point, as light is scattered, with photons; and
   colliding the photons with the opaque carbon dioxide having large molecule clusters to produce the carbon-particle structure.

* * * * *